United States Patent
Bergner et al.

(10) Patent No.: US 12,338,133 B2
(45) Date of Patent: Jun. 24, 2025

(54) PROCESS FOR MAKING PRECURSORS FOR CATHODE ACTIVE MATERIALS, PRECURSORS, AND CATHODE ACTIVE MATERIALS

(71) Applicant: BASF SE, Ludwigshafen am Rhein (DE)

(72) Inventors: Benjamin Johannes Herbert Bergner, Ludwigshafen am Rhein (DE); Tobias Maximilian Teufl, Poing (DE); Rafael Benjamin Berk, Ludwigshafen am Rhein (DE)

(73) Assignee: BASF SE, Ludwigshafen am Rhein (DE)

( * ) Notice: Subject to any disclaimer, the term of this patent is extended or adjusted under 35 U.S.C. 154(b) by 576 days.

(21) Appl. No.: 17/755,295

(22) PCT Filed: Oct. 15, 2020

(86) PCT No.: PCT/EP2020/079103
§ 371 (c)(1),
(2) Date: Apr. 26, 2022

(87) PCT Pub. No.: WO2021/083686
PCT Pub. Date: May 6, 2021

(65) Prior Publication Data
US 2022/0371910 A1    Nov. 24, 2022

(30) Foreign Application Priority Data

Oct. 29, 2019 (EP) .................................. 19205899
Nov. 19, 2019 (EP) .................................. 19210071

(51) Int. Cl.
*C01G 51/82* (2025.01)
*C01G 45/02* (2006.01)
(Continued)

(52) U.S. Cl.
CPC ............. *C01G 45/02* (2013.01); *C01G 45/22* (2025.01); *C01G 51/04* (2013.01); *C01G 51/82* (2025.01);
(Continued)

(58) Field of Classification Search
None
See application file for complete search history.

(56) References Cited

U.S. PATENT DOCUMENTS

2019/0044139 A1* 2/2019 Sakai ................... C01G 53/50
2021/0075012 A1   3/2021 Muramatsu

FOREIGN PATENT DOCUMENTS

EP    3 093 272 A1    11/2016
EP    3 412 634 A1    12/2018
(Continued)

OTHER PUBLICATIONS

International Search Report dated Nov. 10, 2020, from International Application No. PCT/EP2020/079103.
(Continued)

*Primary Examiner* — Wyatt P McConnell
(74) *Attorney, Agent, or Firm* — Armstrong Teasdale LLP

(57) ABSTRACT

Process for making a manganese composite (oxy)hydroxide with a mean particle diameter D50 in the range from 2 to 16 μm comprising the step(s) of combining (a) an aqueous solution containing salts of nickel and of manganese, and, optionally, at least one of Al, Mg, or transition metals other than nickel and manganese wherein at least 50 mole-% of the metal is manganese, (b) with an aqueous solution of an alkali metal hydroxide and (c) an organic acid or its alkali or ammonium salt wherein said organic acid bears at least two functional groups per molecule and at least one of the functional groups is a carboxylate group.

12 Claims, 5 Drawing Sheets

X-Ray diffraction pattern of C-p-CAM.1 using Cu-Kα radiation

(51) Int. Cl.
*C01G 45/22* (2025.01)
*C01G 51/04* (2006.01)
*C01G 53/04* (2006.01)
*C01G 53/82* (2025.01)
*H01M 10/0525* (2010.01)

(52) U.S. Cl.
CPC ............ *C01G 53/04* (2013.01); *C01G 53/82* (2025.01); *H01M 10/0525* (2013.01); *C01P 2002/74* (2013.01); *C01P 2004/61* (2013.01); *C01P 2006/14* (2013.01); *C01P 2006/16* (2013.01); *C01P 2006/40* (2013.01)

(56) References Cited

FOREIGN PATENT DOCUMENTS

| EP | 3486980 | A1 | 5/2019 |
|----|---------|----|--------|
| JP | H1081521 | A | 3/1998 |
| JP | 2017178701 | A | 10/2017 |
| WO | WO-2006/119311 | A2 | 11/2006 |

OTHER PUBLICATIONS

Zhu Jiajia et al., "Three-dimensional porous MXene-derived carbon/nickel-magnanese . . . ," Journal of Electroanalyticval Chemistry, vol. 836, pp. 118-124, Feb. 1, 2019.

Chandrasekaran et al., Hollow nickel-aluminium-maganese layered triple hydroxide . . . , Matierals Chemistry and Physics, Elsevier SA, vol. 195, pp. 247-258, Apr. 22, 2017.

Hai Chao Chen et al., "Synthesis of amorphous nickel-cobalt-maganese hydroxides for supercapacitor . . . ," Energy Storage Materials, vol. 17, pp. 194-203, Jul. 23, 2018.

European Search Report for EP Patent Application No. 19210071.7, Issued on May 26, 2020, 4 pages.

* cited by examiner

Figure 1: X-Ray diffraction pattern of C-p-CAM.1 using Cu-Kα radiation
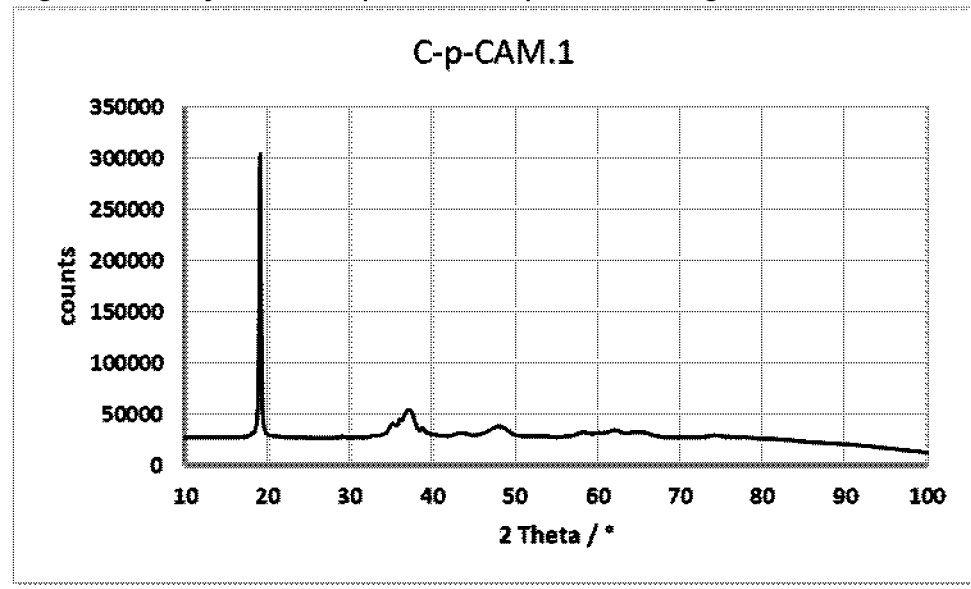
Figure 2: X-Ray diffraction pattern of p-CAM.2 using Cu-Kα radiation
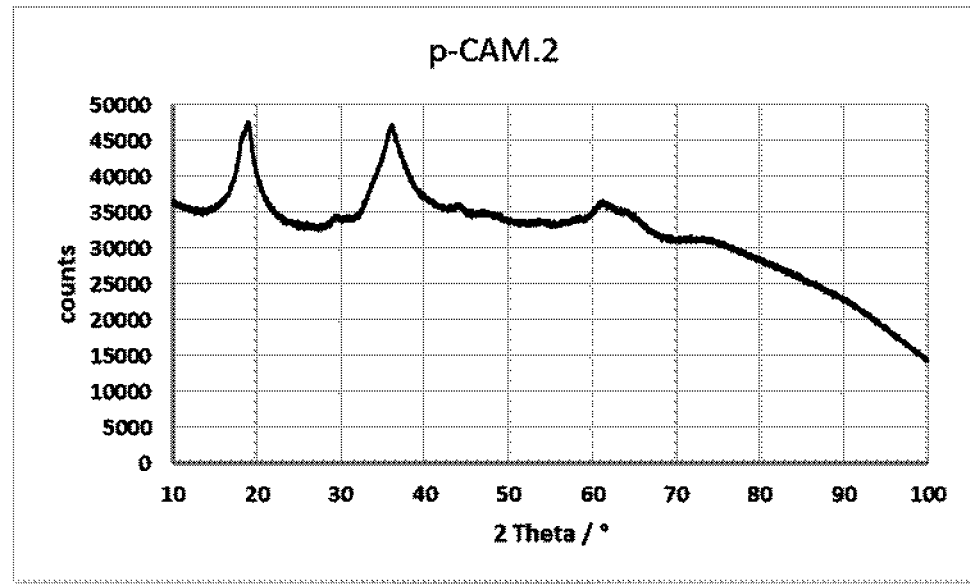

Figure 3: X-Ray diffraction pattern of p-CAM.3 using Cu-Kα radiation
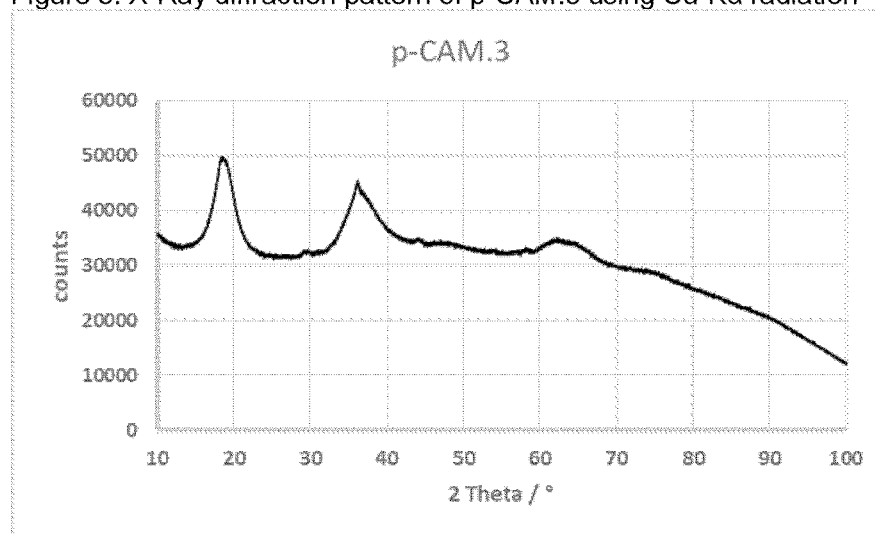
Figure 4: X-Ray diffraction pattern of p-CAM.4 using Cu-Kα radiation
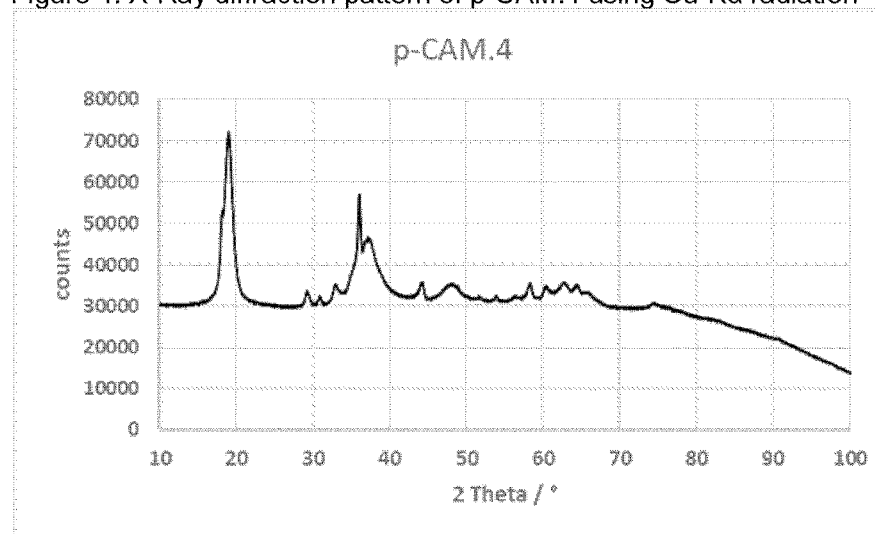
Figure 5: Nitrogen physisorption isotherm of C-p-CAM.1
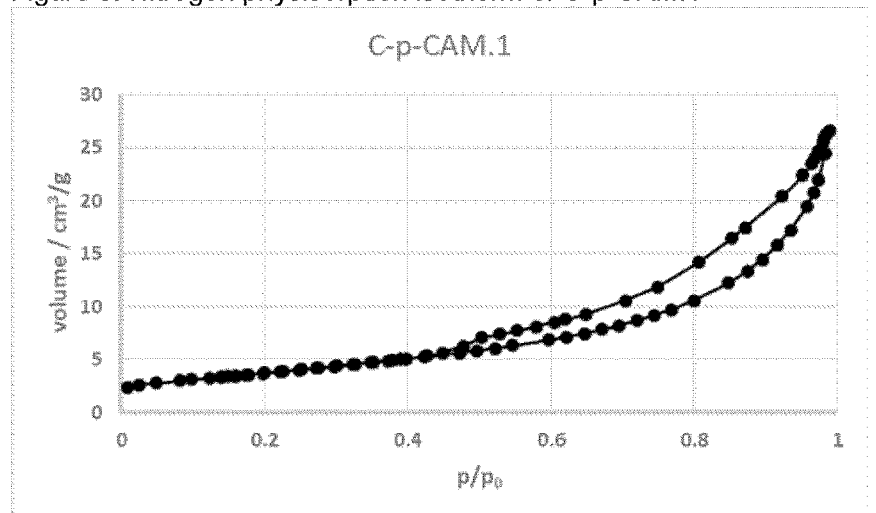

Figure 6: Nitrogen physisorption isotherm of p-CAM.2
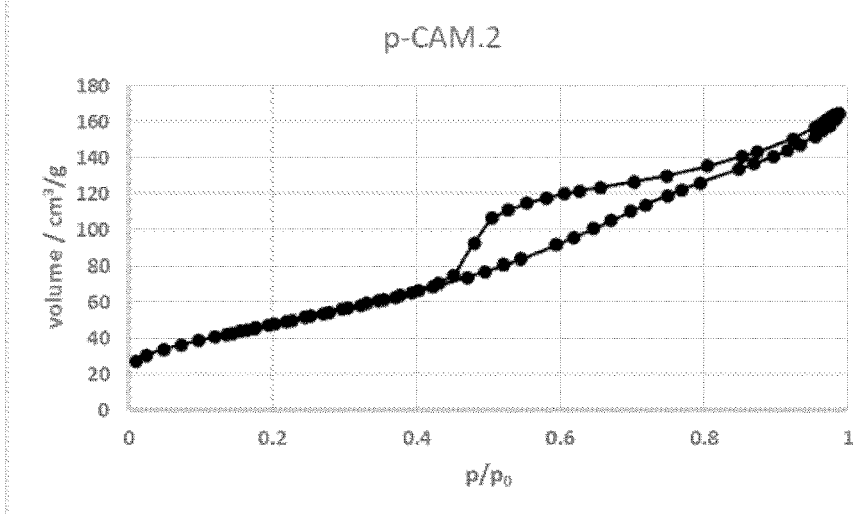
Figure 7: Nitrogen physisorption isotherm of p-CAM.3
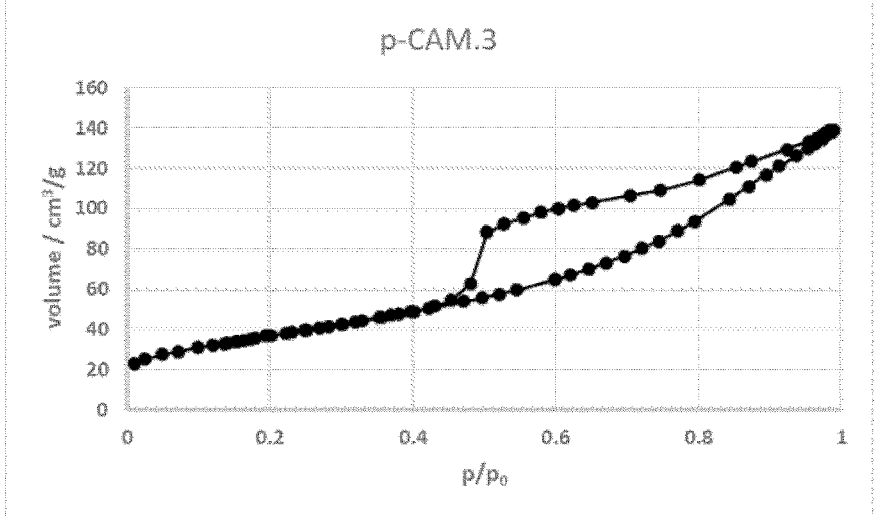
Figure 8: Nitrogen physisorption isotherm of p-CAM.4
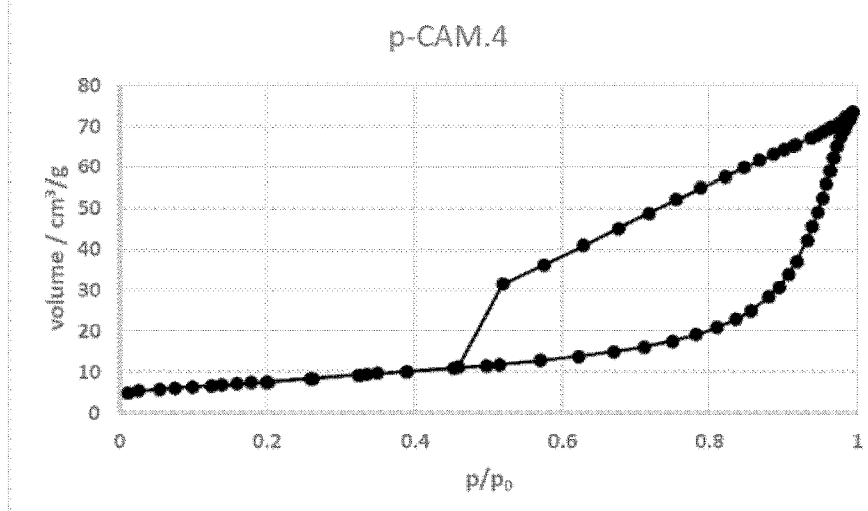

Figure 9: X-Ray diffraction pattern of C-CAM.1 using Mo-Kα radiation
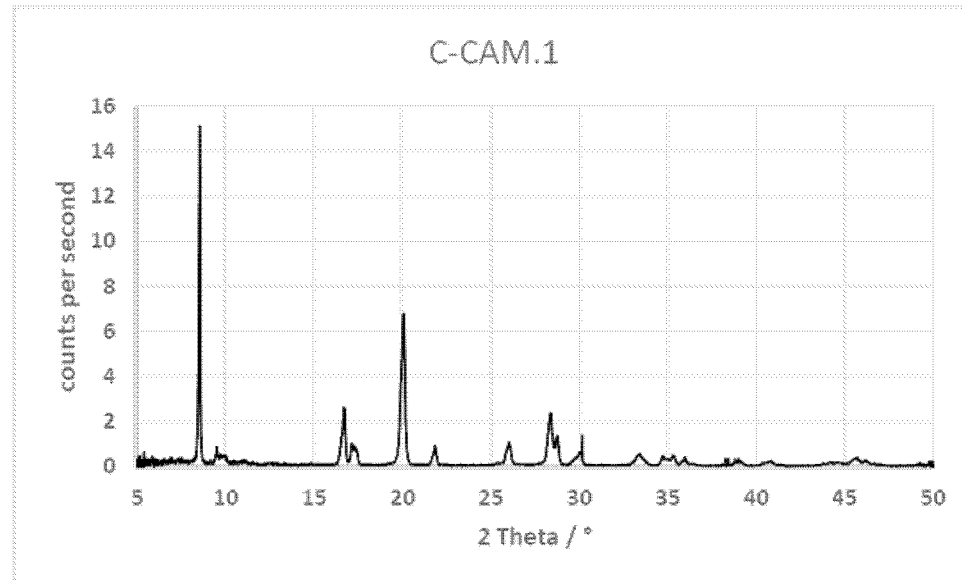
Figure 10: X-Ray diffraction pattern of CAM.2 using Mo-Kα radiation
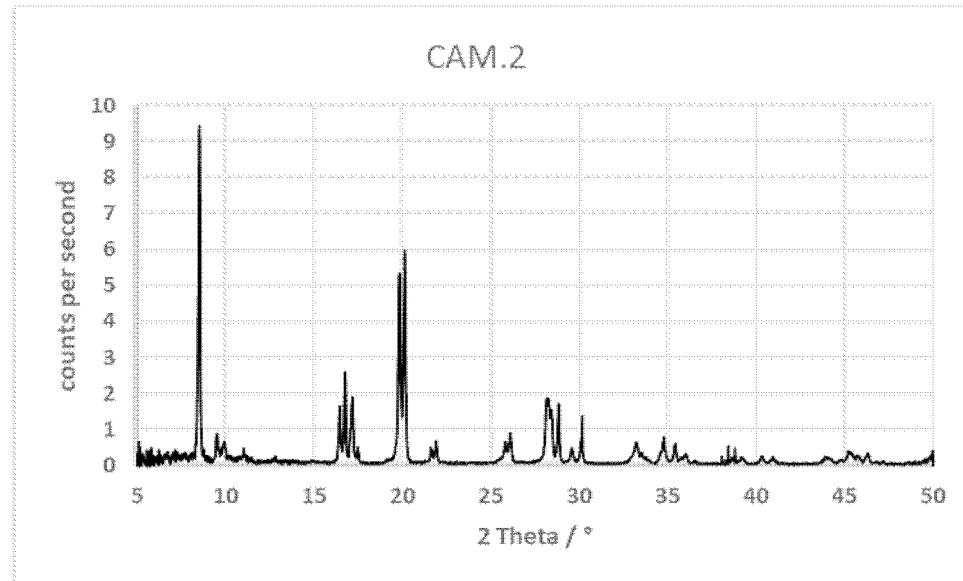

Figure 11: X-Ray diffraction pattern of CAM.3 using Mo-Kα radiation
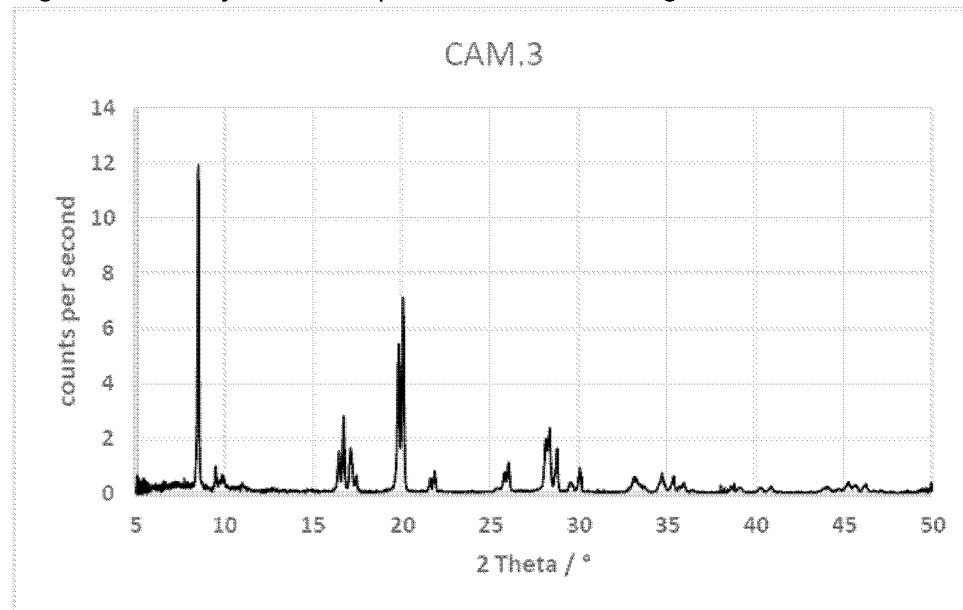
Figure 12: X-Ray diffraction pattern of CAM.4 using Mo-Kα radiation
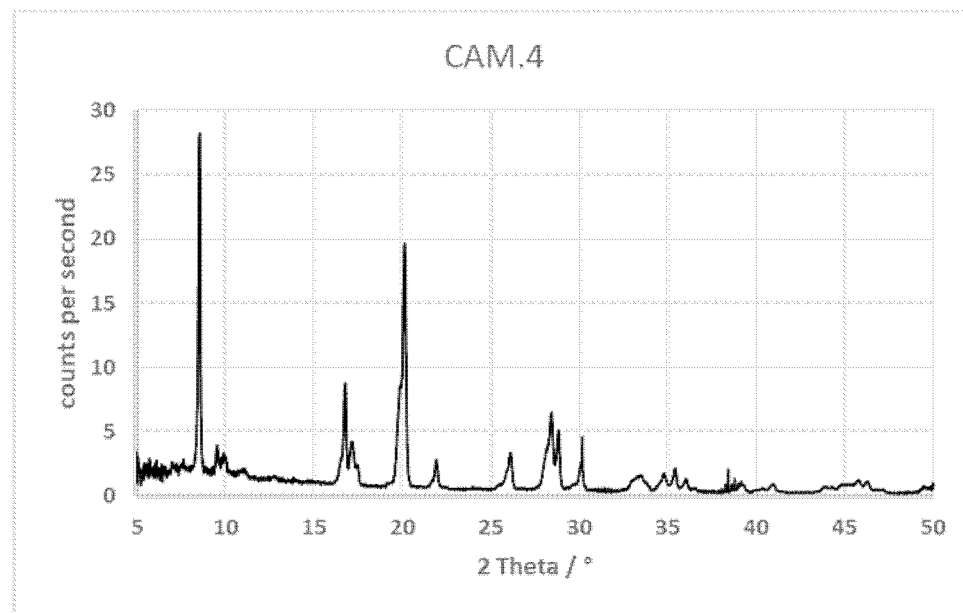

PROCESS FOR MAKING PRECURSORS FOR CATHODE ACTIVE MATERIALS, PRECURSORS, AND CATHODE ACTIVE MATERIALS

This application is a national stage filing under 35 U.S.C. § 371 of International Application No. PCT/EP2020/079103, filed on Oct. 15, 2020, which claims the benefit of priority to European Application No. 19205899.9, filed on Oct. 29, 2019, and European Application No. 19210071.7, filed Nov. 19, 2019; the disclosure of each of these applications are each incorporated herein by reference in its entirety.

The present invention is directed towards a process for making a manganese composite (oxy)hydroxide with a mean particle diameter D50 in the range from 2 to 16 µm comprising the step(s) of combining (a) an aqueous solution containing salts of nickel and of manganese, and, optionally, at least one of Al and Mg, or transition metals other than nickel and manganese wherein at least 50 mole-% of the metal is manganese, (b) with an aqueous solution of an alkali metal hydroxide and (c) an organic acid or its alkali or ammonium salt wherein said organic acid bears at least two functional groups per molecule and at least one of the functional groups is a carboxylate group.

Furthermore, the present invention is directed towards precursors, and to cathode active materials made from precursors.

Lithiated transition metal oxides are currently being used as electrode active materials for lithium-ion batteries. Extensive research and developmental work has been performed in the past years to improve properties like charge density, specific energy, but also other properties like the reduced cycle life and capacity loss that may adversely affect the lifetime or applicability of a lithium-ion battery. Additional effort has been made to improve manufacturing methods.

Many electrode active materials discussed today are of the type of lithiated nickel-cobalt-manganese oxide ("NCM materials") or lithiated nickel-cobalt-aluminum oxide ("NCA materials").

In a typical process for making cathode materials for lithium-ion batteries, first a so-called precursor is being formed by co-precipitating the transition metals as carbonates, oxides or preferably as hydroxides that may or may not be basic. The precursor is then mixed with a lithium salt such as, but not limited to LiOH, $Li_2O$ or—especially—$Li_2CO_3$—and calcined (fired) at high temperatures. Lithium salt(s) can be employed as hydrate(s) or in dehydrated form. The calcination—or firing—generally also referred to as thermal treatment or heat treatment of the precursor—is usually carried out at temperatures in the range of from 600 to 1,000° C. During the thermal treatment a solid state reaction takes place, and the electrode active material is formed. In cases hydroxides or carbonates are used as precursors the solid state reaction follows a removal of water or carbon dioxide. The thermal treatment is performed in the heating zone of an oven or kiln.

Extensive research has been performed on improvement of various properties of cathode active materials, such as energy density, charge-discharge performance such as capacity fading, and the like. However, many cathode active materials suffer from limited cycle life and voltage fade. This applies particularly to many Mn-rich cathode active materials.

In EP 3 486 980, specific high-manganese materials with a high energy density retention rate are disclosed. However, the cathode active materials disclosed suffer from a limited energy density as such.

The morphology of many hydroxide-based precursors with high Mn content leaves room for improvement, see, e.g., Wang et al., *J. of Power Sources* 2015, 274, 151.

It was therefore an objective of the present invention to provide cathode active materials with both a high volumetric energy density and a high energy density retention rate in addition to an excellent morphology. It was further an objective to provide a process for making cathode active materials with both a high volumetric energy density and a high energy density retention rate. It was further an objective to provide applications of cathode active materials with both a high volumetric energy density and a high energy density retention rate.

BRIEF DESCRIPTION OF THE DRAWINGS

FIG. 1 illustrates an X-Ray diffraction pattern of C-p-CAM.1 using Cu-Ka radiation.

FIG. 2 illustrates an X-Ray diffraction pattern of p-CAM.2 using Cu-Ka radiation.

FIG. 3 illustrates an X-Ray diffraction pattern of p-CAM.3 using Cu-Ka radiation.

FIG. 4 illustrates an X-Ray diffraction pattern of p-CAM.4 using Cu-Ka radiation.

FIG. 5 illustrates a nitrogen physisorption isotherm of C-p-CAM.1.

FIG. 6 illustrates a nitrogen physisorption isotherm of p-CAM.2.

FIG. 7 illustrates a nitrogen physisorption isotherm of p-CAM.3.

FIG. 8 illustrates a nitrogen physisorption isotherm of p-CAM.4.

FIG. 9 illustrates an X-Ray diffraction pattern of C-CAM.1 using Mo-Ka radiation.

FIG. 10 illustrates an X-Ray diffraction pattern of CAM.2 using Mo-Ka radiation.

FIG. 11 illustrates an X-Ray diffraction pattern of CAM.3 using Mo-Ka radiation.

FIG. 12 illustrates an X-Ray diffraction pattern of CAM.4 using Mo-Ka radiation.

Accordingly, process as defined at the outset has been found, hereinafter also defined as inventive process or as process according to the current invention or as inventive co-precipitation. The inventive process shall be described in more detail below.

In step (a), a particulate hydroxide, oxide or oxyhydroxide—in brief: (oxy)hydroxide—of manganese, nickel, and, optionally, at least one element of Co and $M^1$, is made, hereinafter also referred to as "precursor". Said precursor is obtained by co-precipitation of a hydroxide of manganese, nickel, and, optionally, at least one element of Co and $M^1$ with alkali metal hydroxide. Said precursor may comprise at least one of Al and Mg, or transition metals other than nickel and manganese. At least 50 mole-% of the metal in said precursor is manganese.

In a preferred embodiment, said manganese composite hydroxide contains a combination of transition metals and further metals according to general formula (I)

$$(Ni_aCo_bMn_c)_{1-d}M^1_d \qquad (I)$$

a is in the range from 0.20 to 0.40, preferably 0.20 to 0.35,
b is in the range of from zero to 0.15, c is in the range of from 0.50 to 0.75, preferably from 0.60 to 0.70, and d is in the range of from zero to 0.015, $M^1$ is selected from Al, Ti, Zr, Mo, Fe, Nb, and Mg, wherein a+b+c=1.0.

In one embodiment of the present invention, the precursor has a mean particle diameter D50 in the range from 2 to 16 µm, preferably 6 to 15 µm. The mean particle diameter D50 in the context of the present invention refers to the median of the volume-based particle diameter, as can be determined by light scattering, for example.

In one embodiment of the present invention, the width of the particle diameter distribution of the precursor is at least 0.61, for example 0.61 to 2, preferably 0.65 to 1.5, expressed as [(d90−d10)/(d50) diameter].

In one embodiment of the present invention, $M^1$ includes Mg in the range of from 0.1 to 2.5 mol-% per sum of metals in said precursor.

In one embodiment of the present invention, said precursor has 0.01 to 10 mol % and preferably 0.3 to 5 mol % of anions other than hydroxide or oxide ions, based on the total number of anions, for example sulfate.

In one embodiment of the present invention, the precursor is made by combining an aqueous solution of water-soluble salts of manganese, nickel, and, optionally cobalt and $M^1$, solution (a), with an aqueous solution of alkali metal hydroxide, solution (b), and with an organic acid or its alkali or ammonium salt wherein said organic acid bears at least two functional groups per molecule, (c). Said organic acid or its alkali or ammonium salt wherein said organic acid bears at least two functional groups per molecule may also be referred to as organic acid (c) or salt of organic acid (c), respectively, and it may be added as such or in aqueous solution or combined with solution (a) or with solution (b) in form of a premix.

The term water-soluble salts of manganese and nickel or of metals other than nickel and manganese refers to salts that exhibit a solubility in distilled water at 25° C. of 25 g/l or more, the amount of salt being determined under omission of crystal water and of water stemming from aquo complexes. Water-soluble salts of nickel, cobalt and manganese may preferably be the respective water-soluble salts of $Ni^{2+}$ and $Mn^{2+}$. Examples of water-soluble salts of nickel and manganese are the sulfates, the nitrates, the acetates and the halides, especially chlorides. Preferred are nitrates and sulfates, of which the sulfates are more preferred.

In one embodiment of the present invention, the concentration of solution (a) can be selected within wide ranges. Preferably, the total concentration is selected such that they are within the range of, in total, 1 to 1.8 mol of the transition metals/kg of solution, more preferably 1.5 to 1.7 mol of the transition metals/kg of solution. "The transition metal salts" used herein refers to the water-soluble salts of nickel and manganese, and as far as applicable, cobalt and $M^1$, and may include salts of other metals, for example of magnesium or aluminum or transition metals other than nickel and manganese.

Another example of water-soluble salts is alum, $KAl(SO_4)_2$.

Solution (a) may have a pH value in the range of from 2 to 6. In embodiments wherein higher pH values are desired, ammonia may be added to solution (a). However, it is preferred to not add ammonia.

Solution (b) is an aqueous solution of alkali metal hydroxide. An example of alkali metal hydroxides is lithium hydroxide, preferred is potassium hydroxide and a combination of sodium and potassium hydroxide, and even more preferred is sodium hydroxide.

Solution (b) may contain some amount of carbonate, e.g., by aging of the solution or the respective alkali metal hydroxide.

The pH value of solution (b) is preferably 13 or higher, for example 14.5.

Furthermore, organic acid (c) or an alkali metal salt of organic acid (c) is formed, for example an alkali metal salt or an ammonium salt of organic acid (c). Said organic acid bears at least two functional groups per molecule of which one is a carboxylic acid group. Ammonia may or may not be used during the step of combining solutions (a) and (b). In such embodiments, it is preferred to add organic acid (c) or an ammonium or alkali metal salt of organic acid (c).

Organic acid (c) or an alkali metal salt of organic acid (c) bears at least two functional groups per molecule of which one is a carboxylic acid group, preferably two to 5 functional groups and at least one is a carboxylate group.

In one embodiment of the present invention said organic acid or its respective salt bears at least two functional groups per molecule that are selected from carboxyl groups, hydroxyl groups and amino groups and wherein at least one is a carboxylate group. Examples of organic acids (c) that bear two identical functional groups are adipic acid, oxalic acid, succinic acid and glutaric acid.

Preferably, the second functional group and, if applicable, further functional groups are selected from carboxyl groups, hydroxyl groups and amino groups. In a preferred embodiment of the present invention, said organic acid (c) or its alkali or ammonium salt, respectively, bears at least two different functional groups, of which at least one is a carboxylate group and at least one is selected from hydroxyl groups and amino groups.

In one embodiment of the present invention, said organic acid (c) is selected from malic acid, tartaric acid, citric acid, and glycine.

In one embodiment of the present invention, the pH value at the end of the step of combining solutions (a) and (b) is in the range from 8 to 12, preferably 9.5 to 12.0, each measured in the mother liquor at 23° C.

In one embodiment of the present invention, the molar amount of acid (c)—or of its respective alkali metal or ammonium salt—is in the range of from 0.1 to 30 mole-%, referring to the sum of nickel and manganese and—to the extent applicable—Al and Mg and transition metals other than nickel and manganese, preferred are 0.5 to 20 mole-% and more preferred 0.7 to 16 mole-%.

In one embodiment of the present invention, the inventive co-precipitation is carried out in the presence of ammonia. Said ammonia may be added as solution (d) or together with any of solutions (a) and/or (b) or together with organic acid (c). However, it is preferred to carry out the inventive process in the absence of ammonia.

In one embodiment of the present invention, the inventive co-precipitation is performed at temperatures in the range from 10 to 85° C., preferably at temperatures in the range from 20 to 60° C.

In one embodiment of the present invention, the inventive co-precipitation is performed under inert gas, for example a noble gas such as argon, or under $N_2$.

In one embodiment of the present invention, a slight excess of alkali metal hydroxide with respect to nickel and manganese and the optional metal is applied, for example 0.1 to 10 mole-%.

In one embodiment of the present invention, the addition of organic acid (c) or its ammonium or alkali metal salt causes the Mn solubility (in g Mn/g water) to be at least half of the solubility of Ni (in g Ni/g water), more preferably of at least 100% of the solubility of Ni (in g Ni/g water) but at maximum 200% of the solubility of Ni (in g Ni/g water) in the mother liquor formed in the inventive co-precipitation.

In one embodiment of the present invention, the addition of organic acid (c) or its ammonium or alkali metal salt causes a Mn solubility (in g Mn/g water) in the precipitation vessel of at least 2 ppm, preferably of at least 10 ppm, more preferably of at least 50 ppm in the mother liquor formed in the inventive co-precipitation. Preferably, the maximum solubility of Mn is 3,000 ppm in the mother liquor.

After combination of solutions (a) and (b) and organic acid (c) or an alkali metal salt of organic acid (c) a slurry is formed. The solids may be isolated by solid-liquid-separation methods, for example decantation, filtration, and by the means of a centrifuge, filtration being preferred. One or more washing steps of the solid residue are preferred.

Then, the residue is dried, for example under air at a temperature in the range of from 100 to 120° C. Preferably, the residual moisture content of the precursor is 1% by weight or below, for example 0.01 to 0.5% by weight. A precursor is obtained from the inventive co-precipitation.

A further aspect of the present invention relates to precursors for the manufacture of electrode active materials for lithium ion batteries. Specifically, this invention relates to a manganese composite (oxy)hydroxide in particulate form with a mean particle diameter in the range from 2 to 16 μm (D50), wherein the metal part has a general formula of

(I)

where the variables are each defined as follows:
a is in the range from 0.20 to 0.40, preferably 0.20 to 0.35,
b is in the range of from zero to 0.15,
c is in the range of from 0.50 to 0.75, preferably from 0.60 to 0.70, and
d is in the range of from zero to 0.015,
$M^1$ is selected from Al, Ti, Zr, Mo, Fe, Nb, and Mg,
wherein a+b+c=1.0
and wherein said manganese composite (oxy)hydroxide has a specific surface (BET) in the range from 20 to 300 m²/g determined according to DIN ISO 9277 (2014) and a pore volume in the range of from 0.06 to 0.5 cm³/g determined according to DIN 6613:19984. Preferred is a specific surface in the range of from 70 to 200 m²/g and a pore volume from 0.1 to 0.28 cm³/g.

Said manganese composite (oxy)hydroxides are hereinafter also referred to as "inventive precursor" or "precursor according to the present invention".

(Oxy)hydroxides in the context of the present invention do not only refer to compounds with equal amounts of oxide and hydroxide anions but to a hydroxide and to any oxide anion-containing hydroxide of the respective metals.

Some metals are ubiquitous such as sodium, calcium or zinc, and traces of them virtually present everywhere, but such traces will not be taken into account in the description of the present invention. Traces in this context will mean amounts of 0.05 mol-% or less, referring to the total metal content of inventive precursor.

In a preferred embodiment of the present invention, inventive precursors have a mean particle diameter D50 in the range from 6 to 15 μm.

In one embodiment of the present invention, the width of the particle diameter distribution of inventive precursors is at least 0.61, for example 0.61 to 2, preferably 0.65 to 1.5, expressed as [(d90-d10)/(d50) diameter].

In one embodiment of the present invention, inventive precursors have an average pore diameter of from 2 to 7.5 nm determined in the range from 2 to 50 nm according to DIN 66134:1998.

In one embodiment of the present invention, the X-ray diffraction pattern of inventive precursors displays a diffraction peak in between 2θ=7.5° and 9.5°, which can be composed of a single diffraction peak or a convolution of at least two diffraction peaks, having a full width at half maximum (FWHM) of at least 0.4, preferably 1.0, using a CuKα X-ray.

Inventive precursors may have a monomodal or bimodal particle diameter distribution.

In one embodiment of the present invention, $M^1$ includes Mg in the range of from 0.1 to 2.5 mol-% per sum of metals in inventive precursors.

In one embodiment of the present invention, inventive precursors contain 0.01 to 10 mol % and preferably 0.3 to 5 mol % of anions other than hydroxide or oxide ions, based on the total number of anions, for example carbonate and/or sulfate.

Inventive precursors are excellently suited as starting material for the manufacture of electrode active materials, especially for the manufacture of cathode active materials for lithium ion batteries. A further aspect of the present invention is thus the use of inventive precursors for the manufacture of cathode active materials for lithium ion batteries. A further aspect of the present invention is a process for making a cathode active material—hereinafter also referred to inventive manufacturing process or manufacturing process according to the present invention. Said inventive manufacturing process comprises the steps of
(α) mixing an inventive precursor with a source of lithium—hereinafter also referred to as step (α)—and
(β) calcining the mixture at a temperature in the range of from 800 to 980° C.— hereinafter also referred to as step (β).

In step (α), a source of lithium is added to the precursor. To perform step (α) of the inventive manufacturing process, the procedure may be, for example, to mix precursor with at least one lithium compound selected from $Li_2O$, LiOH and $Li_2CO_3$, water of crystallization being neglected in the context of the present invention. Preferred source of lithium is $Li_2CO_3$.

To perform step (α), the amounts of precursor and source of lithium are selected so as to obtain the stoichiometry of the desired inventive material. Preferably, precursor and source of lithium compound(s) are selected such that the molar ratio of lithium to the sum of all transition metals of inventive precursor and any $M^1$ that is not a transition metal in is in the range from 1.275:1 to 1.42:1, preferably 1.30:1 to 1.38:1, even more preferably 1.32:1 to 1.36:1.

Step (α) may be performed, e.g., in a plough-share mixer, or a tumble mixer. For laboratory scale experiments, roller mills may be applied as well.

To perform step (β) of the inventive process, the mixture obtained according to step (β) is calcined at a temperature in the range of from 800 to 980° C., preferably 875 to 950° C.

Step (β) of the inventive process can be performed in a furnace, for example in a rotary tube furnace, in a muffle furnace, in a pendulum furnace, in a roller hearth furnace or in a push-through furnace. Combinations of two or more of the aforementioned furnaces are possible as well.

Step (β) of the inventive process can be performed over a period of 30 minutes to 24 hours, preferably 3 to 12 hours. Step (β) can be effected at a temperature level, or a temperature pro-file can be run.

In one embodiment of the present invention, step (β) is performed in an oxygen-containing atmosphere. Oxygen-containing atmosphere includes an atmosphere of air, of pure oxygen, of mixtures from oxygen with air, and of air diluted with an inert gas such as nitrogen. In step (β), preferred is an atmosphere of oxygen or oxygen diluted with air or nitrogen and a minimum content of oxygen of 5 vol.-%.

In one embodiment of the present invention, between steps (α) and (β) at least one pre-calcining step (β*) is being performed. Step (β*) comprises heating the mixture obtained in step (α) at a temperature in the range of from 300 to 700° C. for a period of 2 to 24 hours.

During the temperature changes, a heating rate of 1 K/min up to 10 K/min can be obtained, preferred is 2 to 5 K/min.

After step (β), it is preferred to cool down the material obtained to ambient temperature. A cathode active material is obtained that has an excellent morphology and very good electrochemical properties, especially a high volumetric energy density and a high energy density retention rate.

To further improve the cathode active material obtained from the inventive manufacturing process, two more steps may be performed after step (β), namely (γ) contacting the resultant lithiated oxide with a mineral acid or an aqueous solution of a compound of $M^2$ or a combination thereof, wherein $M^2$ is selected from Al, Ti, Zr, Mo, Fe, Nb, B, and Mg, followed by removal of water, and of (δ) treating the resultant solid residue thermally.

In step (γ), said particulate material is treated with a mineral acid or an aqueous solution of a compound of $M^2$ or a combination thereof, preferably a solution of an inorganic aluminum compound. Said aqueous solution may have a pH value in the range of from 1 up to 8, preferably at least 2, more preferably from 2 to 7. It is observed that at the end of step (γ), the pH value of the aqueous phase is preferably in the range of from 3 to 6.

Examples of mineral acids are nitric acid and in particular sulphuric acid, for example in a concentration of 0.01 M to 2 M, preferably 0.1 to 1.5 M.

It is preferred that the water hardness of said aqueous solution used in step (γ) is at least par-tially removed, especially the calcium. The use of desalinized water is preferred.

Such compound of $M^1$ should be readily soluble in water. "Readily soluble" in this context means a solubility of at least 10 g compound of $M^1$/l water at 25° C.

Examples of suitable aluminum compounds are $Al_2(SO_4)_3$, $KAl(SO_4)_2$, and $Al(NO_3)_3$.

Examples of suitable titanium compounds are $Ti(SO_4)_2$, An example of a suitable zirconium compound is zirconium nitrate, empirical formula $Zr(NO_3)_4$.

Examples of suitable compounds of molybdenum are $MoO_3$, $Na_2MoO_4$, and $Li_2MoO_4$.

Examples of suitable compounds of tungsten are $WO_3$, $Na_2WO_4$, $H_2WO_4$, and $Li_2WO_4$.

Examples of suitable compounds of magnesium are $MgSO_4$, $Mg_2Cl_2$ and $Mg(NO_3)_2$.

An example of a suitable boron compound is boric acid, empirical formula $H_3BO_3$.

In one embodiment, the amount of compound of $M^2$ is in the range of from 0.01 to 5.0 mol-%, referring to TM, preferred are 0.1 to 2.0 mol-%.

In one embodiment of the present invention, said treatment is carried out with a solution of a compound of $M^2$ in a mineral acid, for example a solution of $Al_2(SO_4)_3$ in aqueous $H_2SO_4$.

The treatment in step (γ) may be performed by adding the mineral acid or the solution of $M^1$ to the cathode active material of step (δ) and allowing the resultant mixture to interact. Such inter-action may be enhanced by stirring.

In one embodiment of the present invention, step (γ) is performed at a temperature in the range of from 5 to 85° C., preferred are 10 to 60° C. Ambient temperature is particularly preferred.

In one embodiment of the present invention, step (γ) is performed at normal pressure. It is preferred, though, to perform step (γ) under elevated pressure, for example at 10 mbar to 10 bar above normal pressure, or with suction, for example 50 to 250 mbar below normal pressure, preferably 100 to 200 mbar below normal pressure.

In one embodiment of the present invention, step (γ) is performed in a filter device with stirrer, for example a pressure filter with stirrer or a suction filter with stirrer.

The duration of treatment of the material obtained from step (β) with compound of $M^1$ may be in the range of from 2 to 60 minutes, preferred are 10 to 45 minutes.

In one embodiment of the present invention, the volume ratio of material obtained from step (c) to mineral acid or solution of compound of $M^2$, respectively, is in the range of from 1:1 to 1:10, preferably 1:1 to 1:5.

In one embodiment of the present invention, steps (γ) to (δ) are performed in the same vessel, for example in a filter device with stirrer, for example a pressure filter with stirrer or a suction filter with stirrer.

In one embodiment of the present invention, step (γ) is repeated, for example once to 10 times. In preferred embodiments, step (γ) is performed only once.

Subsequently to the treatment with mineral acid or compound of $M^2$, water is removed. Said water removal may be by evaporation or preferably by solid-liquid separation methods, for example by decantation of by any type of filtration, for example on a band filter or in a filter press. Said removal of water may include complete or partial removal of water, a partial removal being preferred. Together with water, mineral acid and/or non-deposited compound of $M^1$ and or lithium salt may be removed. A residue is obtained that may contain 0.01 to 5% by weight residual moisture.

In one embodiment of the present invention, filter media may be selected from ceramics, sintered glass, sintered metals, organic polymer films, non-wovens, and fabrics.

In step (δ), said residue is treated thermally.

Step (δ) may be carried out in any type of oven, for example a roller hearth kiln, a pusher kiln, a rotary kiln, a pendulum kiln, or—for lab scale trials—in a muffle oven.

The temperature of the thermal treatment according to step (δ) may be in the range of from 150 to 290 or from 300 to 500° C.

The temperature of 300 to 500° C. corresponds to the maximum temperature of step (δ).

It is possible to subject the material obtained from step (γ) directly to step (δ). However, it is preferred to increase the temperature stepwise, or to ramp up the temperature, or to dry the material obtained after step (γ) at first at a temperature in the range of from 40 to 80° C. before subjecting it to step (δ).

Said step-wise increase or ramping up may be performed under normal pressure or reduced pressure, for example 1 to 500 mbar.

Step (δ)—at its maximum temperature—may be performed under normal pressure.

In one embodiment of the present invention, step (δ) is carried out under an oxygen-containing atmosphere, for example air, oxygen-enriched air or pure oxygen.

In embodiments wherein a drying at a temperature in the range of from 100 to 250° C. prior to step (δ) is performed such drying may be performed with a duration of from 10 minutes to 12 hours.

In one embodiment of the present invention, step (δ) is carried out under an atmosphere with reduced $CO_2$ content, e.g., a carbon dioxide content in the range of from 0.01 to 500 ppm by weight, preferred are 0.1 to 50 ppm by weight. The $CO_2$ content may be determined by, e.g., optical methods using infrared light. It is even more preferred to perform step (e) under an atmosphere with a carbon dioxide content below detection limit for example with infrared-light based optical methods.

In one embodiment of the present invention step (δ) has a duration in the range of from 1 to 10 hours, preferably 90 minutes to 6 hours.

In one embodiment of the present invention, the lithium content of an electrode active material is reduced by 1 to 5% by weight, preferably 2 to 4%. Said reduction mainly affects the so-called residual lithium.

By carrying out the inventive process, electrode active materials are obtained with excellent electrochemical properties. Without wishing to be bound by any theory, we assume that the ex-tra aluminum may lead to scavenging lithium compounds deposited at the surface of the electrode active material.

Without wishing to be bound by any theory, we assume that the inventive process leads to an alteration of the surface of particles of the inventive material.

The inventive process may comprise additional—optional—steps, for example rinsing steps after step (γ), or sieving steps after step (δ).

A further aspect of the present invention relates to cathode active materials, hereinafter also referred to as inventive cathode active materials. Inventive cathode active materials may be obtained according to the inventive manufacturing process, and Inventive cathode active materials shall be defined in more detail below.

Inventive cathode active material are particulate form with a mean particle diameter in the range from 2 to 16 μm (D50) and of the composition $Li_{1+x}TM_{1-x}O_2$ wherein x is in the range of from 0.1 to 0.2 and TM is a combination of elements according to general formula (II), wherein the metal part has a general formula of

   (II)

where the variables are each defined as follows:
a is in the range from 0.20 to 0.40, preferably 0.20 to 0.35,
b is in the range of from zero to 0.15,
c is in the range of from 0.50 to 0.75, preferably from 0.60 to 0.70, and
d is in the range of from zero to 0.015,
e is in the range of from zero to 0.15,
$M^1$ is selected from Al, Ti, Zr, Mo, Fe, Nb, and Mg,
$M^2$ is selected from Al, Ti, Zr, Mo, Fe, Nb, B, W, and Mg,
wherein a+b+c=1.0
and wherein said composite oxide has a specific surface (BET), hereinafter also referred to as BET surface, in the range from 0.5 $m^2/g$ to 10 $m^2/g$ and a pressed density of at least 2.7 $g/cm^3$, preferably from 2.72 to 3.1 $g/cm^3$, more preferably from 2.80 to 3.00 $g/cm^3$. The pressed density is determined at a pressure of 250 MPa. The BET surface may be determined by nitrogen adsorption after outgassing of the sample at 200° C. for 30 minutes or more and beyond this accordance with DIN ISO 9277:2010.

In a preferred embodiment, inventive cathode active materials have a structural strain of 0.8% or less, preferably 0.6% or less for the reflection peak between 29.8-30.6° of the corresponding X-Ray diffraction pattern using Mo—Kα X-radiation. The structural strain may be determined by Rietveld refinement from the corresponding diffraction pattern.

Lithium ion batteries comprising at least one electrode according to the present invention exhibit a very good discharge and cycling behavior, and they show good safety behavior.

In one embodiment of the present invention, inventive cathodes contain
(A) at least one inventive material, as described above,
(B) carbon in an electrically conductive state, and
(C) a binder,
(D) a current collector.

In a preferred embodiment of the present invention, inventive cathodes contain
(A) 80 to 99% by weight inventive material,
(B) 0.5 to 19.5% by weight of carbon,
(C) 0.5 to 9.5% by weight of binder material,
percentages referring to the sum of (A), (B) and (C).

Cathodes according to the present invention contain carbon in electrically conductive modifica-tion, in brief also referred to as carbon (B). Carbon (B) can be selected from soot, active carbon, carbon nanotubes, graphene, and graphite. Carbon (B) can be added as such during prepara-tion of electrode materials according to the invention.

Electrodes according to the present invention can comprise further components. They can comprise a current collector (D), such as, but not limited to, an aluminum foil. They further comprise a binder material (C), hereinafter also referred to as binder (C). Current collector (D) is not further described here.

Suitable binders (C) are preferably selected from organic (co)polymers. Suitable (co)polymers, i.e. homopolymers or copolymers, can be selected, for example, from (co)polymers obtainable by anionic, catalytic or free-radical (co) polymerization, especially from polyethylene, polyacrylonitrile, polybutadiene, polystyrene, and copolymers of at least two comonomers selected from ethylene, propylene, styrene, (meth)acrylonitrile and 1,3-butadiene. Polypropylene is also suitable. Polyisoprene and polyacrylates are additionally suitable. Particular preference is given to polyacrylonitrile.

In the context of the present invention, polyacrylonitrile is understood to mean not only polyacrylonitrile homopolymers but also copolymers of acrylonitrile with 1,3-butadiene or styrene. Preference is given to polyacrylonitrile homopolymers.

In the context of the present invention, polyethylene is not only understood to mean homopoly-ethylene, but also copolymers of ethylene which comprise at least 50 mol % of copolymerized ethylene and up to 50 mol % of at least one further comonomer, for example α-olefins such as propylene, butylene (1-butene), 1-hexene, 1-octene, 1-decene, 1-dodecene, 1-pentene, and also isobutene, vinylaromatics, for example styrene, and also (meth)acrylic acid, vinyl acetate, vinyl propionate, $C_1$-$C_{10}$-alkyl esters of (meth) acrylic acid, especially methyl acrylate, methyl methacrylate, ethyl acrylate, ethyl methacrylate, n-butyl acrylate, 2-ethylhexyl acrylate, n-butyl methacrylate, 2-ethylhexyl methacrylate, and also maleic acid, maleic anhydride and itaconic anhydride. Polyethylene may be HDPE or LDPE.

In the context of the present invention, polypropylene is not only understood to mean homopoly-propylene, but also copolymers of propylene which comprise at least 50 mol % of copolymerized propylene and up to 50 mol % of at least one further comonomer, for example ethylene and α-olefins such as butylene, 1-hexene, 1-octene, 1-decene, 1-dodecene and 1-pentene. Polypropylene is preferably isotactic or essentially isotactic polypropylene.

In the context of the present invention, polystyrene is not only understood to mean homopolymers of styrene, but also copolymers with acrylonitrile, 1,3-butadiene, (meth)acrylic acid, $C_1$-$C_{10}$-alkyl esters of (meth)acrylic acid, divinylbenzene, especially 1,3-divinylbenzene, 1,2-diphenylethylene and α-methylstyrene.

Another preferred binder (C) is polybutadiene.

Other suitable binders (C) are selected from polyethylene oxide (PEO), cellulose, carboxy-methylcellulose, polyimides and polyvinyl alcohol.

In one embodiment of the present invention, binder (C) is selected from those (co)polymers which have an average molecular weight $M_w$ in the range from 50,000 to 1,000,000 g/mol, preferably to 500,000 g/mol.

Binder (C) may be cross-linked or non-cross-linked (co)polymers.

In a particularly preferred embodiment of the present invention, binder (C) is selected from halogenated (co)polymers, especially from fluorinated (co)polymers. Halogenated or fluorinated (co)polymers are understood to mean those (co)polymers which comprise at least one (co)polymerized (co)monomer which has at least one halogen atom or at least one fluorine atom per molecule, more preferably at least two halogen atoms or at least two fluorine atoms per molecule. Examples are polyvinyl chloride, polyvinylidene chloride, polytetrafluoroethylene, polyvinylidene fluoride (PVdF), tetrafluoroethylene-hexafluoropropylene copolymers, vinylidene fluoride-hexafluoropropylene copolymers (PVdF-HFP), vinylidene fluoride-tetrafluoroethylene copolymers, perfluoroalkyl vinyl ether copolymers, ethylene-tetrafluoroethylene copolymers, vinylidene fluoride-chlorotrifluoroethylene copolymers and ethylene-chlorofluoroethylene copolymers.

Suitable binders (C) are especially polyvinyl alcohol and halogenated (co)polymers, for example polyvinyl chloride or polyvinylidene chloride, especially fluorinated (co)polymers such as polyvinyl fluoride and especially polyvinylidene fluoride and polytetrafluoroethylene.

Inventive electrodes may comprise 0.5 to 9.5 by weight of binder(s) (C), referring to the sum of component (A), carbon (B) and binder (C).

A further aspect of the present invention is a battery, containing
(A) at least one cathode comprising inventive material (A), carbon (B), and binder (C),
(B) at least one anode, and
(C) at least one electrolyte.

Embodiments of cathode (1) have been described above in detail.

Anode (2) may contain at least one anode active material, such as carbon (graphite), $TiO_2$, lithium titanium oxide, silicon or tin. Anode (2) may additionally contain a current collector, for example a metal foil such as a copper foil.

Electrolyte (3) may comprise at least one non-aqueous solvent, at least one electrolyte salt and, optionally, additives.

Non-aqueous solvents for electrolyte (3) can be liquid or solid at room temperature and is preferably selected from among polymers, cyclic or acyclic ethers, cyclic and acyclic acetals and cyclic or acyclic organic carbonates.

Examples of suitable polymers are, in particular, polyalkylene glycols, preferably poly-$C_1$-$C_4$-alkylene glycols and in particular polyethylene glycols. Polyethylene glycols can here comprise up to 20 mol % of one or more $C_1$-$C_4$-alkylene glycols. Polyalkylene glycols are preferably polyalkylene glycols having two methyl or ethyl end caps.

The molecular weight $M_w$ of suitable polyalkylene glycols and in particular suitable polyethylene glycols can be at least 400 g/mol.

The molecular weight $M_w$ of suitable polyalkylene glycols and in particular suitable polyethylene glycols can be up to 5,000,000 g/mol, preferably up to 2,000,000 g/mol.

Examples of suitable acyclic ethers are, for example, diisopropyl ether, di-n-butyl ether, 1,2-dimethoxyethane, 1,2-diethoxyethane, with preference being given to 1,2-dimethoxyethane.

Examples of suitable cyclic ethers are tetrahydrofuran and 1,4-dioxane.

Examples of suitable acyclic acetals are, for example, dimethoxymethane, diethoxymethane, 1,1-dimethoxyethane and 1,1-diethoxyethane.

Examples of suitable cyclic acetals are 1,3-dioxane and in particular 1,3-dioxolane.

Examples of suitable acyclic organic carbonates are dimethyl carbonate, ethyl methyl carbonate and diethyl carbonate.

Examples of suitable cyclic organic carbonates are compounds of the general formulae (III a) and (III b)

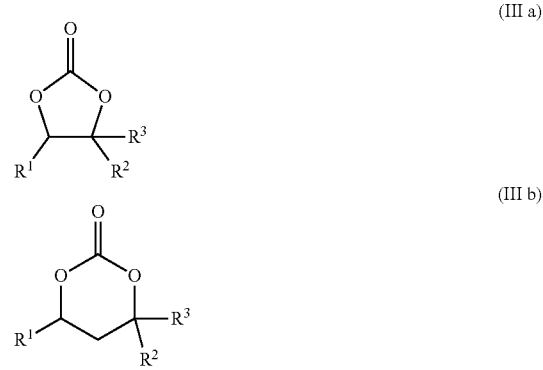

where $R^1$, $R^2$ and $R^3$ can be identical or different and are selected from among hydrogen and $C_1$-$C_4$-alkyl, for example methyl, ethyl, n-propyl, isopropyl, n-butyl, isobutyl, sec-butyl and tert-butyl, with $R^2$ and $R^3$ preferably not both being tert-butyl.

In particularly preferred embodiments, $R^1$ is methyl and $R^2$ and $R^3$ are each hydrogen, or $R^1$, $R^2$ and $R^3$ are each hydrogen.

Another preferred cyclic organic carbonate is vinylene carbonate, formula (IV).

The solvent or solvents is/are preferably used in the water-free state, i.e. with a water content in the range from 1 ppm to 0.1% by weight, which can be determined, for example, by Karl-Fischer titration.

Electrolyte (3) further comprises at least one electrolyte salt. Suitable electrolyte salts are, in particular, lithium salts. Examples of suitable lithium salts are $LiPF_6$, $LiBF_4$, $LiClO_4$, $LiAsF_6$, $LiCF_3SO_3$, $LiC(C_nF_{2n+1}SO_2)_3$, lithium imides such as $LiN(C_nF_{2n+1}SO_2)_2$, where n is an integer in the range from 1 to 20, $LiN(SO_2F)_2$, $Li_2SiF_6$, $LiSbF_6$, $LiAlCl_4$ and salts of the general formula $(C_nF_{2n+1}SO_2)_tYLi$, where m is defined as follows:

t=1, when Y is selected from among oxygen and sulfur,
t=2, when Y is selected from among nitrogen and phosphorus, and
t=3, when Y is selected from among carbon and silicon.

Preferred electrolyte salts are selected from among $LiC(CF_3SO_2)_3$, $LiN(CF_3SO_2)_2$, $LiPF_6$, $LiBF_4$, $LiClO_4$, with particular preference being given to $LiPF_6$ and $LiN(CF_3SO_2)_2$.

In a preferred embodiment of the present invention, electrolyte (3) contains at least one flame retardant. Useful flame retardants may be selected from trialkyl phosphates, said alkyl being different or identical, friaryl phosphates, alkyl dialkyl phosphonates, and halogenated trialkyl phosphates. Preferred are tri-$C_1$-$C_4$-alkyl phosphates, said $C_1$-$C_4$-alkyls being different or identical, tribenzyl phosphate, triphenyl phosphate, $C_1$-$C_4$-alkyl di-$C_1$-$C_4$-alkyl phosphonates, and fluorinated tri-$C_1$-$C_4$-alkyl phosphates, In a preferred embodiment, electrolyte (3) comprises at least one flame retardant selected from trimethyl phosphate, $CH_3$—$P(O)(OCH_3)_2$, triphenylphosphate, and tris-(2,2,2-trifluoroethyl)-phosphate.

Electrolyte (3) may contain 1 to 10% by weight of flame retardant, based on the total amount of electrolyte.

In an embodiment of the present invention, batteries according to the invention comprise one or more separators (4) by means of which the electrodes are mechanically separated. Suitable separators (4) are polymer films, in particular porous polymer films, which are unreactive toward metallic lithium. Particularly suitable materials for separators (4) are polyolefins, in particular film-forming porous polyethylene and film-forming porous polypropylene.

Separators (4) composed of polyolefin, in particular polyethylene or polypropylene, can have a porosity in the range from 35 to 50%. Suitable pore diameters are, for example, in the range from 30 to 500 nm.

In another embodiment of the present invention, separators (4) can be selected from among PET nonwovens filled with inorganic particles. Such separators can have a porosity in the range from 40 to 55%. Suitable pore diameters are, for example, in the range from 80 to 750 nm.

Batteries according to the invention can further comprise a housing which can have any shape, for example cuboidal or the shape of a cylindrical disk. In one variant, a metal foil configured as a pouch is used as housing.

Batteries according to the invention provide a very good discharge and cycling behavior, in particular at high temperatures (45° C. or higher, for example up to 60° C.) in particular with respect to the capacity loss.

Batteries according to the invention can comprise two or more electrochemical cells that combined with one another, for example can be connected in series or connected in parallel. Con-nection in series is preferred. In batteries according to the present invention, at least one of the electrochemical cells contains at least one electrode according to the invention. Preferably, in electrochemical cells according to the present invention, the majority of the electrochemical cells contain an electrode according to the present invention. Even more preferably, in batteries according to the present invention all the electrochemical cells contain electrodes according to the present invention.

The present invention further provides for the use of batteries according to the invention in appliances, in particular in mobile appliances. Examples of mobile appliances are vehicles, for example automobiles, bicycles, aircraft or water vehicles such as boats or ships. Other examples of mobile appliances are those which move manually, for example computers, especially laptops, telephones or electric hand tools, for example in the building sector, especially drills, battery-powered screwdrivers or battery-powered staplers.

The present invention is further illustrated by working examples.

Percentages refer to weight percent unless defined otherwise.

Strains were obtained by Rietveld refinement using the modelling software DIFFRAC.TOPAS provided by Bruker AXS GmbH, Karlsruhe Manufacture of a comparative precursor C-p-CAM.1

Step (a.1): An aqueous mixed $MnSO_4$/$NiSO_4$ solution with the concentrations $c_1(Mn)$=1.10 mol/kg and $c_1(Ni)$ =0.55 mol/kg, referred to as solution 1, was combined with an aqueous 25 wt. % NaOH solution, referred to as solution 2, and an aqueous 25% ammonia ($NH_3$) solution, referred to as solution 3, at 50° C. under nitrogen atmosphere using a continuously stirred tank reactor with a volume V=2.4 l. Solution 2 and solution 3 were mixed before addition into the reactor. The individual flow rates of the solutions, further referred to as $f_i$ with i referring to the number of the corresponding solution, were adjusted to meet a residence time $t_{res}$=V/($f_1$+$f_2$+$f_3$)=5 h, a pH value of 11.5 in the reactor and a ratio of $c_R(NH_3)/(c_R(Ni)+c_R(Mn))$=0.4, wherein $c_R(NH_3)$, $c_R(Ni)$, $c_R(Mn)$ are the concentrations in mol/kg of ammonia, nickel and manganese in the reactor. A stirrer with two crossed blades was applied and the stirring speed was 850 rpm. Particles of C-p-CAM.1 were precipitated in the reactor and transferred into a second vessel by a continuous flow through an outlet for collection. Afterwards, the freshly precipitated particles were washed with deionized water at room temperature, dried under air at 120° C. for 12 hours and sieved to obtain precursor C-p-CAM.1, average diameter (d50): 9.7 μm.

Manufacture of a Comparative Cathode Active Material C-CAM.1

Step (b.1) The precursor C-p-CAM.1 was subsequently mixed with $Li_2CO_3$ monohydrate in a molar ratio of Li: (Mn+Ni) of 1.31:1, poured into an alumina crucible and calcined at 900° C. for 5 hours under oxygen atmosphere (10 exchanges/h) using a heating rate of 2° C./min. The resultant material was cooled to ambient temperature at a cooling rate of 10° C./min and subsequently sieved with a mesh size of 32 μm. After sieving, the resultant material was stirred in a beaker with 80 mL of aqueous $H_2SO_4$ (0.1M) for 20 min. Then, the liquid phase was removed by filtration and the filter cake was rinsed with 80 mL $H_2O$. Then the filter cake was again stirred in a beaker with 80 mL of aqueous $H_2SO_4$ (0.1 M) for another 20 min. The liquid phase was removed by filtration and the filter cake was washed with 2×80 mL $H_2O$. The resultant filter cake was dried in vacuum for 3 hours at 65° C., then dried for 16 hours at 300° C. and cooled down to ambient temperature to obtain C-CAM.1

Manufacture of a Precursor p-CAM.2

Step (a.2): An aqueous mixed $MnSO_4$/$NiSO_4$ solution with the concentrations $c_1(Mn)$=1.10 mol/kg and $c_1(Ni)$ =0.55 mol/kg, also referred to as solution 1, was combined with an aqueous 25 wt. % NaOH solution, also referred to as solution 2, an aqueous 25% ammonia ($NH_3$) solution, also referred to as solution 3, and an aqueous solution of trisodium citrate with a concentration of $c_4$(citrate)=1.2 mol/kg, also referred to as solution 4, at 60° C. under nitrogen atmosphere using a continuously stirred tank reactor with a volume V=2.4 l. Solution 2 and solution 3 were premixed before addition into the reactor. The individual flow rates of the solutions, further referred to as $f_i$ with i referring to the number of the corresponding solution, were adjusted to meet a residence time $t_{res}$=V/($f_1$+$f_2$+$f_3$+$f_4$)=5 hours, a pH value of 11.1 in the reactor and a ratio of $c_R(NH_3)/(c_R(Ni)+c_R(Mn)$=0.03 and $c_R$(citrate)/($c_R(Ni)+c_R(Mn)$)=0.12, wherein $c_R(NH_3)$, $c_R$(citrate). $c_R(Ni)$, $c_R(Mn)$ are the concentrations in mol/kg of ammonia, citrate, nickel and manganese in the reactor. A stirrer with two crossed blades was applied using a stirring speed of 850 rpm. Particles of p-CAM.2 were precipitated in the reactor and transferred into a second vessel by a continuous flow through an outlet for collection. Afterwards, the freshly precipitated particles were washed with deionized water at room temperature under air, dried at 120° C. for 12 hours and sieved to obtain precursor p-CAM.2 with an average diameter (d50) of 7.1 μm.

Manufacture of a Cathode Active Material CAM.2

Step (b.2) The precursor p-CAM.2 was subsequently mixed with $Li_2CO_3$ monohydrate in a molar ratio of Li:(Mn+Ni) of 1.31:1, poured into an alumina crucible and heated at 900° C. for 5 hours under oxygen atmosphere (10 exchanges/h) using a heating rate of 2° C./min. The resultant material was cooled to ambient temperature at a cooling rate of 10° C./min and subsequently sieved using a mesh size of 32 μm. After sieving, the resultant material was stirred in a beaker with 80 mL of aqueous $H_2SO_4$ (0.1M) for 20 min. Then, the liquid phase was removed by filtration and the filter cake was rinsed with 80 mL $H_2O$. Then the filter cake was again stirred in a beaker with 80 mL of aqueous $H_2SO_4$ (0.1 M) for another 20 min. The liquid phase was removed by filtration and the filter cake was washed with 2×80 mL $H_2O$. The resultant filter cake was dried in vacuum for 3 hours at 65° C., then dried for 16 hours at 300° C. and cooled down to ambient temperature to obtain CAM.2

Manufacture of a Precursor p-CAM.3

Step (a.3): An aqueous mixed $MnSO_4$/$NiSO_4$ solution with the concentrations $c_1$(Mn)=1.10 mol/kg and $c_1$(Ni)=0.55 mol/kg, also referred to as solution 1, was combined with an aqueous 25 wt. % NaOH solution, further referred to as solution 2, an aqueous 25% ammonia ($NH_3$) solution, further referred to as solution 3, and an aqueous solution of sodium tartrate with a concentration of $c_5$(tartrate)=1.2 mol/kg, further referred to as solution 5, at 50° C. under nitrogen atmosphere using a continuously stirred tank reactor with a volume V=2.4 l. Solution 2 and solution 3 were premixed before flowing into the reactor. The individual flow rates of the solutions, further referred to as $f_i$ with i referring to the number of the corresponding solution, were adjusted to meet a residence time $t_{res}$=V/($f_1$+$f_2$+$f_3$+$f_5$)=5 h, a pH of 11.5 in the reactor and a ratio of $c_R(NH_3)/(c_R(Ni)+c_R(Mn))$=0.03 and $c_R$(tartrate)/($c_R(Ni)+c_R(Mn))$=0.12, wherein $c_R(NH_3)$, $c_R$(tartrate). $c_R(Ni)$, $c_R(Mn)$ are the concentrations in mol/kg of ammonia, citrate, nickel and manganese in the reactor. A stirrer with two crossed blades was applied. The stirring speed was 850 rpm. Particles were precipitated in the reactor and transferred into a second vessel by a continuous flow through an outlet for collection. Afterwards, the freshly precipitated particles were washed with deionized water at room temperature under air, dried at 120° C. for 12 h and sieved to obtain precursor p-CAM.3 with an average diameter of 4.8 μm.

Manufacture of a Cathode Active Material CAM.3

Step (b.3) The precursor p-CAM.3 was subsequently mixed with $Li_2CO_3$ monohydrate in a molar ratio of Li:(Mn+Ni) of 1.31:1, poured into an alumina crucible and heated at 900° C. for 5 hours under oxygen atmosphere (10 exchanges/h) using a heating rate of 2° C./min. The resultant material was cooled to ambient temperature at a cooling rate of 10° C./min and subsequently sieved using a mesh size of 32 μm. After sieving, the resultant material was stirred in a beaker with 80 mL of aqueous $H_2SO_4$ (0.1M) for 20 min. Then, the liquid phase was removed by filtration and the filter cake was rinsed with 80 mL $H_2O$. Then the filter cake was again stirred in a beaker with 80 mL of aqueous $H_2SO_4$ (0.1 M) for another 20 min. The liquid phase was removed by filtration and the filter cake was washed with 2×80 mL $H_2O$. The resultant filter cake was dried in vacuum for 3 hours at 65° C., then dried for 16 hours at 300° C. and cooled down to ambient temperature to obtain CAM.3.

Manufacture of a Precursor p-CAM.4

Step (a.4): An aqueous mixed $MnSO_4$/$NiSO_4$ solution with the concentrations $c_1$(Mn)=1.10 mol/kg and $c_1$(Ni)=0.55 mol/kg, further referred to as solution 1, was combined with an ague-ous 25 wt. % NaOH solution, further referred to as solution 2, an aqueous 25% ammonia ($NH_3$) solution, further referred to as solution 3, and an aqueous solution of oxalic acid with a concentration of $c_6$(oxalic acid)=0.7 mol/kg, further referred to as solution 6, at 50° C. under nitrogen atmosphere using a continuously stirred tank reactor with a volume V=2.4 l. Solution 2 and solution 3 were premixed before flowing into the reactor. The individual flow rates of the solutions, further referred to as $f_i$ with i referring to the number of the corresponding solution, were adjusted to meet a residence time $t_{res}$=V/($f_1$+$f_2$+$f_3$+$f_6$)=5 h, a pH of 11.3 in the reactor and a ratio of $c_R(NH_3)/(c_R(Ni)+c_R(Mn))$=0.03 and $c_R$(oxalate)/($c_R(Ni)+c_R(Mn))$=0.12, wherein $c_R(NH_3)$, $c_R$(tartrate). $c_R(Ni)$, $c_R(Mn)$ are the concentrations in mol/kg of ammonia, citrate, nickel and manganese in the reactor. A stirrer with two crossed blades was applied using a stirring speed of 850 rpm. Particles with a defined size were precipitated in the reactor and transferred into a second vessel by a continuous flow through an outlet for collection. Afterwards, the freshly precipitated particles were washed with deionized water at room temperature, dried under air at 120° C. for 12 h and sieved to obtain precursor p-CAM.4.

Manufacture of a Cathode Active Material CAM.4

Step (b.4) The precursor p-CAM.4 was mixed with $Li_2CO_3$ monohydrate in a molar ratio of Li:(Mn+Ni) of 1.31:1, poured into an alumina crucible and calcined at 900° C. for 5 hours under oxygen atmosphere (10 exchanges/h) using a heating rate of 2° C./min. The resultant material was cooled to ambient temperature at a cooling rate of 10° C./min and subsequently sieved using a mesh size of 32 μm. After sieving the resultant material was stirred in a beaker with 80 mL of aqueous $H_2SO_4$ (0.1M) for 20 min. Afterwards the liquid phase was removed by filtration and the filter cake was rinsed with 80 mL $H_2O$. Then the filter cake was again stirred in a beaker with 80 mL of aqueous $H_2SO_4$ (0.1 M) for another 20 min. The liquid phase was removed by filtration and the filter cake was washed with 2×80 mL $H_2O$. The resultant filter cake was dried in vacuum for 3 hours at 65° C., then dried for 16 hours at 300° C. and cooled down to ambient temperature to obtain CAM.4 with an average diameter (d50) of 20.0 μm.

The properties of the precursors are summarized in Table 1, properties of the cathode active materials in Table 2.

TABLE 1

Properties of inventive precursors and comparative precursors

| Sample | D50 [μm] | FWHM (7.5°-9.5°) | BET surface [m²/g] | Mesopore volume [cm³/g] | Average pore diameter [nm] |
|---|---|---|---|---|---|
| C-p-CAM.1 | 9.7 | 0.237 | 13.2 | 0.043 | 9.42 |
| p-CAM.2 | 7.1 | 2.313 | 177 | 0.27 | 4.74 |
| p-CAM.3 | 4.8 | 2.828 | 120 | 0.23 | 5.15 |
| p-CAM.4 | 20.0 | 1.51 | 27.4 | 0.16 | 5.62 |

FWHM: describes the full width at half maximum of the diffraction peak in between $2\Theta=7.5°$ and $9.5°$ in the corresponding diffraction pattern which was measured using Cu-Kα radiation. This diffraction peak can be either composed of a single diffraction peak or a convolution of at least two diffraction peaks. Based on the nitrogen physisorption measurements of the different precursors, the BET surface area was determined according to DIN ISO 9277, the mesopore volume was determined according to DIN 66134 and the average pore diameter was determined in the range from 2 to 50 nm according to DIN 66134.

Manufacture of a Precursor p-CAM.5

Step (a.5): An aqueous mixed $MnSO_4/NiSO_4/Al_2(SO_4)_3$ solution with the concentrations $c_1(Mn)=1.10$ mol/kg, $c_1(Ni)=0.55$ mol/kg and $c_1(Al)=0.008$ mol/kg, also referred to as solution 1, was combined with an aqueous 25 wt. % NaOH solution, also referred to as solution 2, an aqueous 25% ammonia ($NH_3$) solution, also referred to as solution 3, and an aqueous solution of trisodium citrate with a concentration of $c_4(citrate)=1.2$ mol/kg, also referred to as solution 4, at 60° C. under nitrogen atmosphere using a continuously stirred tank reactor with a volume V=2.4 l. Solution 2 and solution 3 were premixed before addition into the reactor. The individual flow rates of the solutions, further referred to as $f_i$ with i referring to the number of the corresponding solution, were adjusted to meet a residence time $t_{res}=V/(f_1+f_2+f_3+f_4)=5$ hours, a pH value of 11.3 in the reactor and a ratio of $c_R(NH_3)/(c_R(Ni)+c_R(Mn))=0.03$ and $c_R(citrate)/(c_R(Ni)+c_R(Mn))=0.12$, wherein $c_R(NH_3)$, $c_R(citrate)$, $c_R(Ni)$, $c_R(Mn)$ are the concentrations in mol/kg of ammonia, citrate, nickel and manganese in the reactor. A stirrer with two crossed blades was applied using a stirring speed of 850 rpm. Particles of p-CAM.5 were precipitated in the reactor and transferred into a second vessel by a continuous flow through an outlet for collection. Afterwards, the freshly precipitated particles were washed with deionized water at room temperature under air, dried at 120° C. for 12 hours and sieved to obtain precursor p-CAM.5 with an average diameter (d50) of around 5 μm.

Manufacture of a Cathode Active Material CAM.5

Step (b.5) The precursor p-CAM.5 was subsequently mixed with $Li_2CO_3$ monohydrate in a molar ratio of Li:(Mn+Ni+Al) of 1.31:1, poured into an alumina crucible and heated at 900° C. for 5 hours under oxygen atmosphere (10 exchanges/h) using a heating rate of 2° C./min. The resultant material was cooled to ambient temperature at a cooling rate of 10° C./min and subsequently sieved using a mesh size of 32 μm. After sieving the material was stirred in a beaker with 80 mL of aqueous $H_2SO_4$ (0.1M) for 20 min. Afterwards the liquid phase was removed by filtration and the filter cake was rinsed with 80 mL $H_2O$. Then the powder was again stirred in a beaker with 80 mL of aqueous $H_2SO_4$ (0.1 M) for another 20 min. The liquid phase was removed by filtration and the filter cake was washed with 2×80 mL $H_2O$. The resultant filter cake was dried in vacuum for 3 hours at 65° C., then dried for 16 hours at 300° C. and cooled down to ambient temperature to obtain CAM.5. Similar to those made from CAM.2 to CAM.4, electrodes made from CAM.5 show excellent properties.

TABLE 2

Properties of inventive cathode active materials and of a comparative material

| Sample | Pressed density [g/cm³] | Structural strain [%] | 1st charge capacity [mAh/g] | 1st discharge capacity [mAh/g] | 1st coulombic efficiency [%] | 1st average discharge voltage [V] |
|---|---|---|---|---|---|---|
| C-CAM.1 | 2.64 | 0.91 | 168.5 ± 8.4 | 140.3 ± 6.5 | 83.3 | 3.63 ± 0.01 |
| CAM.2 | 2.72 | 0.28 | 260.1 ± 0.8 | 233.6 ± 0.6 | 89.8 | 3.43 ± 0.01 |
| CAM.3 | 2.96 | 0.44 | 199.6 ± 7.8 | 184.0 ± 4.3 | 92.2 | 3.43 ± 0.02 |
| CAM.4 | 2.82 | 0.49 | 213.3 ± 2.1 | 181.2 ± 1.9 | 85.0 | 3.55 ± 0.01 |

Structural strain was determined by Rietveld refinement for the reflection peak between 29.8-30.6° of the corresponding X-Ray diffraction pattern using Mo—Kα radiation.

Electrode manufacture: Electrodes contained 92.5% CAM, 2% carbon black (Super C65), 2% graphite (SFG6L) and 3.5% binder (polyvinylidene fluoride, Solef 5130). Slurries were mixed in N-methyl-2-pyrrolidone and cast onto aluminum foil by doctor blade. After drying of the electrodes 6 h at 105° C. in vacuo, circular electrodes were punched, weighed and dried at 120° C. under vacuum for 12 hours before entering in an Ar filled glove box.

Half-Cell Electrochemical Measurements: Coin-type electrochemical cells, were assembled in an argon-filled glovebox. The positive 14 mm diameter (loading 8.0±0.5 mg $cm^{-2}$) electrode was separated from the 0.58 thick Li foil by a glass fiber separator (Whatman GF/D). An amount of 95 μl of 1 M $LiPF_6$ in fluoroethylene carbonate (FEC): diethyl carbonate (DEC), 2:8 by weight, was used as the electrolyte. Cells were galvanostatically cycled at a Maccor 4000 battery cycler between 2.0 and 4.8 V at room temperature by applying a C-rates of 0.067 C.

The invention claimed is:

1. A process for making a manganese composite (oxy) hydroxide with a mean particle diameter D50 ranging from 2 μm to 16 μm comprising:
    combining:
    (a) an aqueous solution comprising transition metal salts of nickel and of manganese, and of, optionally, at least one of Al, Mg, or transition metals other than nickel and manganese, wherein at least 50 mole-% of the total metal content in the transition metal salts is manganese, (b) with an aqueous solution of an alkali metal hydroxide, and
(c) an organic acid or its alkali or ammonium salt, wherein the organic acid bears at least two functional groups per molecule and at least one of the functional groups is a carboxylate group,
wherein the manganese composite (oxy) hydroxide comprises a combination of transition metals and further metals according to general formula (I)

$$(Ni_aCo_bMn_c)_{1-d}M^1{}_d \quad (I)$$

a ranges from 0.20 to 0.40,
b ranges of from zero to 0.15,
c ranges of from 0.50 to 0.75, and
d ranges from zero to 0.015,
$M^1$ is selected from Al, Ti, Zr, Mo, Fe, Nb, and Mg, and wherein a+b+c=1.0.

2. The process according to claim 1, wherein the organic acid or its alkali or ammonium salt, respectively, bears at least two different functional groups, wherein one is a carboxylate group and the other is selected from hydroxyl groups and amino groups.

3. The process according to claim 1, wherein the organic acid is selected from malic acid, tartaric acid, citric acid, and glycine.

4. A manganese composite (oxy)hydroxide in particulate form with a mean particle diameter ranging from 2 μm to 16 μm (D50), wherein the metal part has a general formula of $$(Ni_aCo_bMn_c)_{1-d}M^1{}_d \quad (I)$$

wherein:
a ranges from 0.20 to 0.40,
b ranges from zero to 0.15,
C ranges from 0.50 to 0.75, and
d ranges from zero to 0.015,
$M^1$ is selected from Al, Ti, Zr, Mo, Fe, Nb, and Mg, wherein a+b+c=1.0, and
wherein the composite (oxy) hydroxide has a specific surface (BET) ranging from 20 m²/g to 300 m²/g determined according to DIN ISO 9277 (2014) and a mesopore volume ranging from 0.06 cm³/g to 0.5 cm³/g determined according to DIN 66134:1998.

5. The composite (oxy) hydroxide according to claim 4, wherein the composite has an average pore diameter ranging from 2 nm to 7.5 nm, determined in a range from 2 nm to 50 nm according to DIN 66134:1998.

6. The composite (oxy) hydroxide according to claim 4, wherein the composite has an X-ray diffraction pattern with a diffraction peak between 2θ=7.5° and 9.5°, which can be either composed of a single diffraction peak or a convolution of at least two diffraction peaks, having a full width at half maximum (FWHM) of at least 0.4 using a Cu Kα X-ray.

7. A process for making a cathode active material for lithium ion batteries, wherein the process comprises the steps of
(α) mixing a manganese composite (oxy)hydroxide according to claim 4 with a source of lithium, and of
(β) calcining the mixture at a temperature in ranging from 800° C. to 980° C. to form a resultant lithiated oxide.

8. The process according to claim 7, further comprising:
(γ) contacting the resultant lithiated oxide with a mineral acid or an aqueous solution of a compound of $M^2$ or a combination thereof, wherein $M^2$ is selected from Al, Ti, Zr, Mo, Fe, Nb, B, and Mg, followed by removal of water to form a resultant solid residue, and
(δ) treating the resultant solid residue thermally.

9. The process according to claim 8, wherein the removal of water is performed by a solid-liquid separation step.

10. A cathode active material in particulate form with a mean particle diameter ranging from 2 μm to 16 μm (D50), wherein the cathode active material has the composition $Li_{1+x}TM_{1-x}O_2$, wherein x ranges from 0.1 to 0.2 and TM is a combination of elements according to general formula (II), wherein the metal part has a general formula of $$(Ni_aCo_bMn_c)_{1-d-e}M^1{}_dM^2{}_e \quad (II)$$

wherein the variables are each defined as follows:
a ranges from 0.20 to 0.40,
b ranges from zero to 0.15,
c ranges from 0.50 to 0.75, and
d ranges from zero to 0.015,
e ranges from zero to 0.015,
$M^1$ is selected from Al, Ti, Zr, Mo, Fe, Nb, and Mg,
$M^2$ is selected from Al, Ti, Zr, Mo, Fe, Nb, B, W, and Mg,
wherein a+b+c=1.0, and
wherein the composite oxide has a specific surface (BET) ranging from 0.5 m²/g to 10 m²/g and a pressed density of at least 2.7 m²/g determined at a pressure of 250 MPa.

11. The cathode active material according to claim 10, wherein the cathode active material has a structural strain of 0.8% or less obtained by Rietveld refinement for the reflection peak between 29.8° to 30.6° of a corresponding X-Ray diffraction pattern using Mo-Kα radiation.

12. An electrode comprising
(A) at least one material according to claim 10,
(B) carbon in electrically conductive form, and
(C) a binder.

* * * * *